US012384917B1

(12) United States Patent
Brothers et al.

(10) Patent No.: US 12,384,917 B1
(45) Date of Patent: Aug. 12, 2025

(54) PHYSICAL CHARACTERISTICS OF POLYSILYLETHER POLYMERS IN ADDITIVE MANUFACTURING OF ENERGETIC MATERIALS

(71) Applicant: The United States of America as Represented by the Secretary of the Navy, Indian Head, MD (US)

(72) Inventors: Robert C. Brothers, Potomac, MD (US); Rebecca Wilson, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 370 days.

(21) Appl. No.: 17/803,087

(22) Filed: Feb. 3, 2022

(51) Int. Cl.
| | |
|---|---|
| *C08L 83/16* | (2006.01) |
| *B29C 64/165* | (2017.01) |
| *B33Y 10/00* | (2015.01) |
| *B33Y 70/10* | (2020.01) |
| *C08G 18/24* | (2006.01) |
| *C08G 18/50* | (2006.01) |
| *C08G 77/06* | (2006.01) |
| *C08G 77/18* | (2006.01) |
| *C08G 77/60* | (2006.01) |
| *C08K 5/22* | (2006.01) |
| *C08K 5/32* | (2006.01) |
| *C08K 5/3492* | (2006.01) |
| *B29K 71/00* | (2006.01) |
| *B29K 105/24* | (2006.01) |
| *C06B 21/00* | (2006.01) |
| *C06B 45/10* | (2006.01) |
| *C08G 77/34* | (2006.01) |

(52) U.S. Cl.
CPC ............ *C08L 83/16* (2013.01); *B29C 64/165* (2017.08); *B33Y 10/00* (2014.12); *B33Y 70/10* (2020.01); *C08G 18/242* (2013.01); *C08G 18/5096* (2013.01); *C08G 77/06* (2013.01); *C08G 77/18* (2013.01); *C08G 77/60* (2013.01); *C08K 5/22* (2013.01); *C08K 5/32* (2013.01); *C08K 5/3492* (2013.01); *B29K 2071/00* (2013.01); *B29K 2105/24* (2013.01); *C06B 21/0033* (2013.01); *C06B 45/10* (2013.01); *C08G 77/34* (2013.01)

(58) Field of Classification Search
None
See application file for complete search history.

(56) References Cited

U.S. PATENT DOCUMENTS 3,346,515 A * 10/1967 Curry ................... C08G 77/60
528/38

OTHER PUBLICATIONS

"Incorporating a silicon unit into a polyether backbone—an effective approach to enhance polyether solubility in CO2" authored by Zhang et al., and published in RSC Advances (2017), 7, 16616-16622.*
"Silicon Acetal Metathesis Polymerization" authored by Sahmetlioglu et al. and published in ACS Macro Letters (2016) 5, 466-470.*
"Versatile Manganese Catalysis for the Synthesis of Poly(silyl ethers) from Diols and Dicarbonyls with Hydrosilanes" authored by Vijamari et al. and published in ACS Omega (2017) 2, 582-591.*
"Production of Organometallic Polymers by the Interfacial Technique. II Kinetic Study of the Production of Polyoxyethyloxy(diphenylsilylene) by the Interfacial Technique" authored by Carraher and published in Journal of Polymer Science (1969) 2359-2363.*
U.S. Appl. No. 17/300,536, filed Aug. 4, 2021, Robert C. Brothers, et al. Synthesis of polysilylether polymers in additive manufacturing of energetic materials.
Cheng, Chen; Watts, Annabelle; Hillmyer, Marc; Hartwig, John. Polysilylether: A Degradable Polymer from Biorenewable Feedstocks. Anew. Chem. Int. Ed. (2016) 55, 11872-11876. DOI: 10.1002/anie.201606282.
Carraher, Charles. Production of Organometallic Polymers by the Interfacial Technique. I. Interfacial Production of Polyalkyloxysilanes and a Study of Some Reaction Variables. Journal of Polymer Science: Part A-1 (1969) 7, 2351-2358.
Carraher, Charles. Production of Organometallic Polymers by the Interfacial Technique. V. Partial Mechanistic Study of the Production of Poly[alkyl(aryl)oxysilanes]. Journal of Polymer Science: Part A-1 (1970) 8, 973-978.
Carraher, Charles. Production of Organometallic Polymers by the Interfacial Technique. X. Influence of the Nature of Base Employed on the Synthesis of Polysilylalkylene (arylene) diamines. Journal of Polymer Science: Part A-1 (1970) 8, 3051-3059.
Dunnavant, W. R.; Markle, R. A.; Stickney, P. B. Synthesis of Polyaryloxysilanes by Melt-Polymerizing Dianilino- and Diphenosysilanes with Aromatic Diols. Journal of Polymer Science: Part A-1 (1967) 5, 707-724.
Nagasaki, Yukio; Matsukura, Fumiaki; Kato, Masao. New Thermosensitive Rubbery Polymers. Synthesis of Poly (siloxyethylene glycol) and its Aqueous Solution Properties. Macromolecules (1996) 29, 5859-5863.

* cited by examiner

*Primary Examiner* — Marc S Zimmer
(74) *Attorney, Agent, or Firm* — Fredric J. Zimmerman

(57) ABSTRACT

The physical characteristics of synthesized polysilylether (PSE) polymers used as high solids loading binders for an energetic material are described, and related methods. These physical characteristics ranged from fluid-liquids to oily-liquids, to pastes, to viscous goos, too taffy-like materials, and too thermoplastic solids. For the most part, thermal decomposition temperatures were high, while glass transition temperatures were low, indicating a good operating range for most of the PSE polymers. Two PSE polymers characterized as thermoplastic solids had ideal softening and melting temperatures for use in filament generation and extrusion of high solids loading binders.

1 Claim, 6 Drawing Sheets

Figure 6

PHYSICAL CHARACTERISTICS OF POLYSILYLETHER POLYMERS IN ADDITIVE MANUFACTURING OF ENERGETIC MATERIALS

STATEMENT OF GOVERNMENT USE

The invention described herein was made in the performance of official duties by employees of the Department of Navy and may be manufactured, used, licensed by or for the Government of the United States of America for any governmental purpose without payment of any royalties thereon.

FIELD OF THE INVENTION

The present invention discloses the physical characteristics of polysilylether (PSE) polymers for use as binders in the additive manufacturing (AM) of energetic and reactive materials. Some of these polymers are novel and some have previously been reported in the literature. The physical characteristics of all the PSE polymers of this invention resulted from the mild, tolerant, and efficient chemical syntheses of PSE polymers disclosed in a related patent application filed with the USPTO on Aug. 4, 2021, entitled "Syntheses of Polysilylether Polymers in Additive Manufacturing of Energetic Materials."

BACKGROUND OF THE INVENTION

Introduction

Additive manufacturing (AM) of energetic and reactive materials offers several possibilities for manufacturing munitions. The most obvious advantage is safety, where having an automated manufacturing setup will reduce the danger posed to workers. Additive manufacturing, e.g., 3D printing, allows materials to be printed with unique shapes and geometries, offering specialized solutions to specific situations and enhanced performance by tailoring burn rate or detonation. In addition to manufacturing advantages, additive manufacturing offers several strategic advantages. Since 3D printers are portable, this technology would allow for on-demand production of mission specific items that could be generated in the field. Furthermore, the feedstocks can be prepared ahead of time and stored until they are needed for use. For example, in the case of thermoplastic printing, the filament can be spooled and stored until an object is required to be printed. Additionally, most new 3D printers have dual nozzles that could be used to mix two different feed stocks. This configuration would allow for the separation of and safer storage of two reactive materials, such as fuel and oxidizer, which could be combined via AM prior to use.

One of the biggest challenges for 3D printing is obtaining a high solids loading, while retaining good printability. Since energetic formulations typically have a very high solids loading, it is imperative that the binder be capable of printing with a high solids loading. For this to be possible, a polymer with polar functional groups would be desirable for improving interactions with highly polar energetic materials or inorganic metal fuels. However, the polymer also needs to retain a semi-flexible backbone for printability. Silicon based polymers are known for having excellent printability properties, likely due to the flexibility of silicon-carbon or silicon-oxygen bonds. Additionally, the polar nature of a silicon-oxygen linkage is likely to offer favorable interactions with polar nitro groups on energetic molecules, and highly polar inorganic metals.

Numerous types of silicon-based polymers exist. The best known are silicones, also known as polysiloxanes. Polysiloxanes contain a repeating backbone of alternating silicon and oxygen atoms (—Si—O—Si—O—), where alkyl or aryl substituents are bonded to the silicon atoms. FIG. 1(a) shows a polysiloxane, in this case-polydimethylsiloxane, with a —Si—O—Si—O— repeating backbone, where dimethyl substituents are bonded to the silicon atoms. These polymers all have the same backbone chain, however, there has been extensive research into functionalizing the dialkyl substitutions to tweak the polymer properties.

Polysilylether (PSE) polymers are a similar, but slightly different group of silicon-based polymers. This class of polymers contains alternating units of dialkyl or diaryl silicon monomers and diol monomers. FIG. 1(b) shows a polysilylether, in this case-poly(ethylene glycol)dimethylsilylether, with a —Si—O-CarbonGroup-O—Si—O-CarbonGroup-O repeating backbone that has an alkyl or aryl substituent, in this case-dimethyl, bonded to the silicon atoms, and an alkyl or aryl linker group, in this case-ethylene, linking the oxygen atoms. Thus, PSE polymers have a repeating backbone of a silicon atom bonded to an oxygen atom that is then bonded to a carbon group which, in turn, is bonded to another oxygen atom (—Si—O-CarbonGroup-O—Si—O-CarbonGroup-O—), as shown in FIG. 1(b). PSE polymers are unique in that they are highly tailorable along the polymer backbone, thus allowing for manipulation of their physical properties. Additionally, these polymers can further be tailored based on the functionalization of the starting monomers prior to polymerization.

As binders, polysilylether (PSE) polymers are extremely appealing for multiple reasons. In addition to good printability and high solids loading tolerance, these polymers are expected to retain the desirable properties of other silicon-based polymers i.e., good thermal and mechanical properties. Furthermore, preliminary work indicates that these polymers may offer an appealing option for biodegradable polymeric materials. Additionally, the synthesis of these materials offers several advantages. The modular synthesis of a diol monomer reacting with a silicon monomer means that these polymers will be highly tailorable based on which monomers are used in the polymerization reaction. This approach will allow structure optimization to obtain a polymer with ideal physical characteristics to function as a binder in additive manufacturing of energetic materials. Moreover, there is further tailor-ability for the base structure of the polymer. The monomers used in this reaction can be functionalized prior to polymerization, offering polymers with specific functionalities for different applications. For example, iodo-, fluoro-, or nitro-groups, could be incorporated to obtain a resulting polymer with biocidal, metal oxidizing, or energetic properties. This chemistry, to functionalize diols or silicon monomers has been widely studied and is well documented in the literature.

Preparation of Polysilylether (PSE) Polymers

The literature reports limited work on the syntheses and study of polysilylethers (PSEs). Most reported efforts involve using highly expensive Rhodium catalysts, which were determined to be undesirable for this effort. More recently, a less expensive Manganese catalyst was demonstrated to be useful for the synthesis of PSE polymers. However, this catalyst could also participate in side reactions that could be problematic in future efforts to prepare functionalized polymers. Therefore, our efforts focused on developing mild and efficient syntheses for polysilylether (PSE) polymers. Some of these polymers are novel and some have previously been reported in the literature. However, none of these reported polymers have been prepared by the mild, tolerant, efficient, and optimized syntheses described by the present invention. Additionally, there have been no prior efforts to explore the application of these PSE polymers as binders in the additive manufacturing (AM) of energetic and reactive material.

Optimization of the syntheses for polysilylether (PSE) polymers involved exploring several different polymerization reactions. Initial efforts focused on reacting a commercially available dialkyldichlorosilane, i.e., dimethyldichlorosilane, with a commercially available diol, i.e., ethylene glycol, under anhydrous conditions to obtain the resulting PSE polymer, i.e., poly(ethylene glycol)dimethylsilylether, as shown by FIG. 2, under various reaction conditions ("a" of FIG. 2) including different solvents, bases, times, temperatures, and pressures. These reactions appeared to proceed smoothly and upon evaporation of solvent they yielded sticky, goo-like products that appeared to be polymeric in structure. NMR analysis confirmed a one-to-one ratio of the individual starting monomers. This ratio remained constant regardless of any extractions or washing to purify the polymer, indicating that the monomers were linked together. However, upon GPC analysis these materials were found to be very short oligomers of only four to six units. Adjusting reaction time, reaction temperature, reaction pressure, type of solvent and solvent quantity, as well as type and quantity of base were unsuccessful at improving the chain length for these polymers. Therefore, it became apparent that another synthetic approach would be necessary to obtain the desired materials with higher molecular weights.

Other work on preparing PSE polymers indicates it is necessary to convert the dialkyldichlorosilane into a monomer with different reactivity to obtain polymers with high molecular weights. In this work, the dialkyldichlorosilane was converted into the dialkyldianilinosilane derivative by reaction "a" of FIG. 3, which required: aniline, pyridine, rt, and ON, which was then polymerized with aromatic diols, according to reaction "b" of FIG. 3, which required hydroquinone and solvent-free melt polymerization under vacuum at 300° C. This approach relied on using very high reaction temperatures to distill off aniline as the polymer was formed, thus forcing the chemistry toward the desired product. However, this chemistry was not demonstrated on non-aromatic diols, likely because these monomers have lower boiling points and would distill off the reaction before polymerizing. Efforts to replicate the synthesis were unsuccessful in obtaining the desired products. Additionally, it was determined that the harsh reaction conditions were unsuitable for developing polymers with the desired sensitive functional groups (such as nitro, iodo, and fluoro moieties). Furthermore, the reported aromatic-based polymers were brittle solids with extremely high melting points that would be unsuitable for use as binders. For these reasons, it became apparent that another approach would be necessary.

Recently, a similar reactivity approach was used to produce end-linked copolymers of polydimethylsiloxane and polyethylene glycol polymers. In this approach the terminal silicon atoms on polydimethylsiloxane were functionalized with diethyl amine and reacted with hydroxyl terminated polyethylene glycol to give the resulting copolymer by reaction "a", shown in FIG. 4, which required THF, 60° C. and 24h. Published results indicated good reactivity and obtained a high degree of polymerization. This approach, however, has not been used to produce PSE polymers.

PSE polymers were successfully synthesized using a similar, although different approach, to the above-mentioned copolymer synthesis. In this different approach dialkyldichlorosilanes were converted into dialkylbis(diethylamino) silanes, which were then polymerized with various diols to obtain the resulting PSE polymer, as shown by FIG. 5, where reaction "a" requires diethyl amine, 0° C.→rt, 20 h and hexane, while reaction "b" requires ethylene glycol, THF, 60° C. and 4d. The model system for developing the chemical syntheses of PSE polymers was based on the monomers dimethyldichlorosilane and ethylene glycol, as shown in FIG. 5. Based on another reported procedure, dimethyldichlorosilane was converted into dimethylbis(diethylamino) silane by reaction "a" of FIG. 5. Then polymerizations between dimethylbis(diethylamino) silane and ethylene glycol were studied using the reaction shown in FIG. 4, to optimize for the desired PSE polymer resulting from reaction "b" of FIG. 5. Reaction condition variations for the chemical syntheses of PSE polymers included changing reaction solvent, reaction time, and reaction temperature. The best results were obtained using THF as the solvent, while reacting at 60° C. for 4 days. The resulting PSE polymers were found to have a 1:1 ratio of the monomer units according to NMR, and a MW of 150,000 according to GPC.

SUMMARY OF THE INVENTION

An exemplary embodiment of the invention describes a method of coating aluminum (al) particles with a high solids loading binder containing a polysilylether (PSE) polymer for an energetic material. The method includes: adding 1 equivalent of bis(diethylamino)diphenylsilane to a solution of 1 equivalent of ethylene glycol dissolved in 10 equivalents of tetrahydrofuran to form a mixture; heating the mixture to 60° C. while reflux condensing, then cooling and concentrating the mixture under vacuum, forming a resultant mixture containing the polysilylether (PSE) polymer, poly(ethylene glycol)diphenylsilylether; dissolving the resultant mixture in dichloromethane and extracting unreacted monomers with water; removing the dichloromethane under reduced pressure giving a yield of the poly(ethylene glycol)diphenylsilylether, which when uncured is physically characterized as a sticky, viscous goo; dissolving the poly(ethylene glycol)diphenylsilylether in diethyl ether and mixing with Al particles of 1-3 μm in a ratio of 80% Al and 20% PSE polymer, poly(ethylene glycol)diphenylsilylether; and evaporating the diethyl ether to obtain the Al particles evaporatively coated with the PSE polymer, poly(ethylene glycol)diphenylsilylether.

Another embodiment of the invention describes a polysilylether (PSE) polymer that is compatible with 1,3,5-Trinitroperhydro-1,3,5-triazine (RDX), as determined by differential scanning calorimetry (DSC), the PSE polymer forming a binder in an energetic material, the PSE polymer consisting of one of: uncured poly(ethylene glycol)dimethylsilylether; uncured poly(1,6-hexanediol)dimethylsilylether; uncured poly(ethylene glycol)diphenylsilylether; and uncured poly(1,6-hexanediol)diphenylsilylether.

Yet another embodiment of the invention describes a method of curing polysilylether (PSE) polymers with isocyanates. The method includes one of: mixing a PSE polymer, poly(1,6-hexane diol)dimethylsilylether with isophorone diisocyanate (IPDI) and a catalyst, dibutyltin dilaurate (DBTDL), and allowing the mixture to cure at room temperature for 6 days to form the cured PSE polymer, cured poly(1,6-hexane diol)dimethylsilylether, a viscous goo with a consistency similar to honey; and mixing a PSE polymer, poly(1,6-hexanediol)diphenylsilylether with isophorone diisocyanate (IPDI) and a catalyst, dibutyltin dilaurate (DBTDL), and allowing the mixture to cure at room temperature for 6 days to form the cured PSE polymer, cured poly(1,6-hexanediol)diphenylsilylether, a spongey rubbery material.

BRIEF DESCRIPTION OF THE DRAWINGS

Various non-limiting embodiments are further described with reference to the accompanying drawings in which:

FIG. 6 illustrates a table that shows twelve PSE polymers, each PSE polymer being identified by a bold-faced number, that were prepared using the optimized model reaction shown in FIG. 5 using from top to bottom, three silicon-based monomers: bis(diethylamino)dimethylsilane, bis(diethylamino)diphenylsilane, and bis(diethylamino)methylphenyl silane; and four diol monomers: ethylene glycol, hydroquinone, 1,4-cyclohexanediol and 1,6-hexanediol. Each resulting PSE polymer was characterized by its physical state, molecular weight (MW), thermal decomposition temperature, ($T_d$), glass transition temperature, ($T_g$), and for PSE polymers 6 and 7, their melting points (MP) according to an embodiment of the invention.

DETAILED DESCRIPTION OF THE INVENTION

Figure 1B:
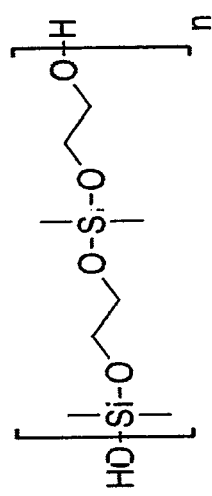
FIG. 1(b) illustrates Poly(ethylene glycol)dimethylsilylether, a polysilylether (PSE), with —Si—O-CarbonGroup-O—Si—O-CarbonGroup-O repeating backbone that has alkyl or aryl substituents, dimethyl in this case, off of the silicon atoms, and an alkyl or aryl linker group, ethylene in this case, between the oxygen atoms according to an embodiment of the invention.
Figure 1A:
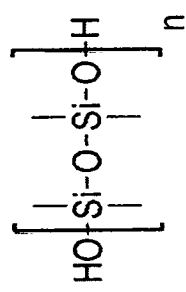
FIG. 1(a) illustrates a polysiloxane, i.e., poly dimethylsiloxane, with —Si—O—Si—O-repeating backbone and alkyl or aryl substituents, in this case-dimethyl, off of the silicon atoms according to an embodiment of the invention.
Figure 2:
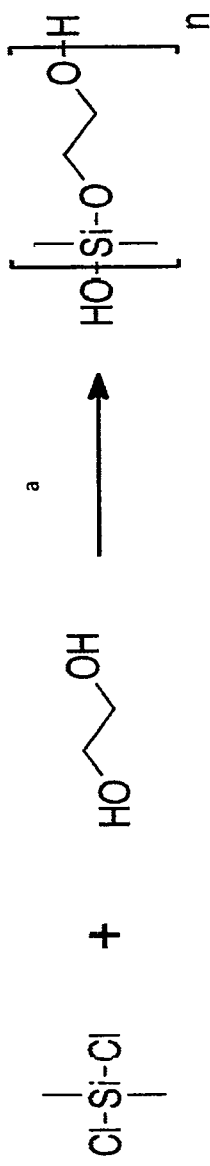
FIG. 2 illustrates the reaction of a dialkyldichlorosilane, i.e., dimethyldichlorosilane, and a diol, i.e., ethylene glycol, to produce a polysilylether (PSE), i.e., poly(ethylene glycol)dimethylsilylether according to an embodiment of the invention.
Figure 3:
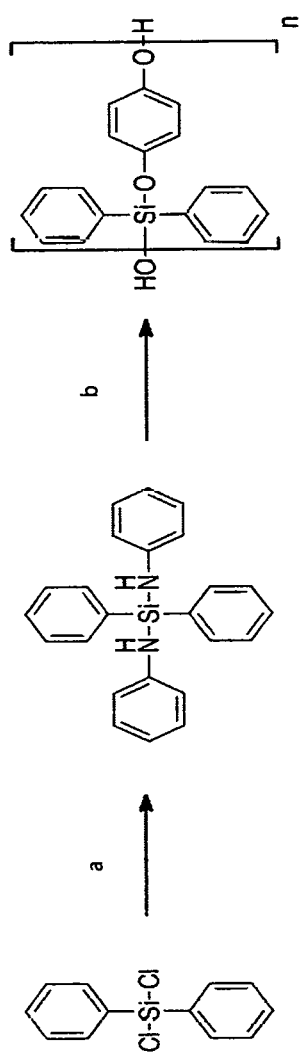
FIG. 3 illustrates a reported synthesis for aromatic PSE polymers, where reaction "a" requires aniline, pyridine, rt and ON, while reaction "b" requires hydroquinone and solvent free melt polymerization under vacuum at 300° C. according to an embodiment of the invention.
Figure 4:
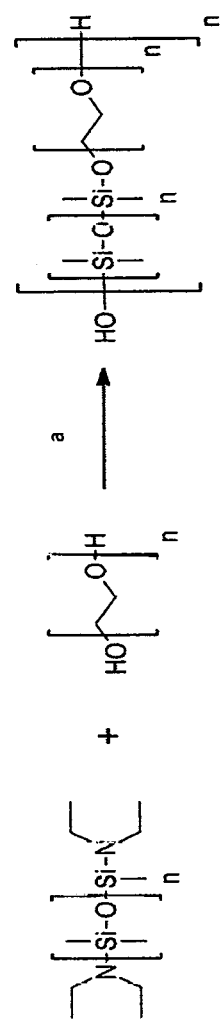
FIG. 4 illustrates a reported synthesis for the copolymer of polydimethylsiloxane and polyethylene glycol, where reaction "a" requires THF, 60° C. and 24$h$ according to an embodiment of the invention.
Figure 5:
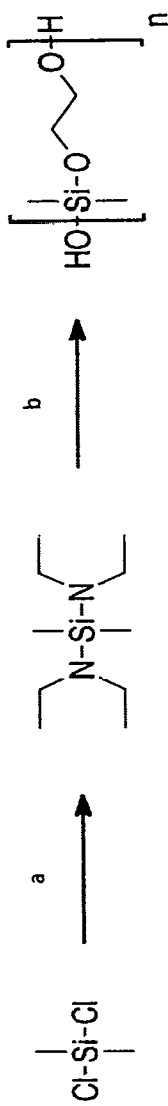
FIG. 5 illustrates the model reaction used to optimize a quick and efficient mild synthesis for PSE polymers. These reaction conditions were used to synthesize all PSE polymers of the invention, where reaction "a" requires diethyl amine, 0° C.→rt, 20 h and hexane to convert a dialkyldichlorosilane, e.g., dimethyldichlorosilane, to a dialkylbis (diethylamino) silane, e.g., dimethylbis(diethylamino) silane, while reaction "b" polymerizes the dialkylbis(diethylamino) silane with a diol, e.g., ethylene glycol, THF, 60° C. and 4d according to an embodiment of the invention.

The optimized method of chemical syntheses for PSE polymers, shown in FIG. 5, was used to synthesize the PSE polymers of the invention.

Actual Process: Reaction "a" of FIG. 5 illustrates the conversion of a dialkyldichlorosilane into a dialkylbis(diethylamino) silane monomer. The conversion took place in a stirred solution of diethylamine (5 equivalents) in a Schlenk flask with a positive flow of argon, which was cooled to 0° C. in an ice bath. Cold dialkyldichlorosilane (1 equivalent) was added dropwise slowly. The reaction mixture was allowed to stir overnight, while slowly warming to room temperature. The reaction mixture was diluted with hexane and cannula filtered. The hexane and excess diethyl amine were removed by evaporation. The product was purified by vacuum distillation, giving the resulting dialkylbis(diethylamino) silane derivative in yields ranging from 30-50% depending on the alkyl groups.

Reaction "b" of FIG. 5 illustrates the polymerization of the dialkylbis(diethylamino) silane monomer and a diol monomer to produce the PSE polymer of the invention. A stirred solution of diol (1 equivalent) dissolved in THF (10 equivalents) was prepared in a round bottom flask. Dialkylbis(diethylamino) silane (1 equivalent) was added to the reaction mixture. A reflux condenser was attached to the round bottom flask and the reaction was heated to 60° C. for four days. The reaction mixture was allowed to cool then slowly concentrated under vacuum. The resulting mixture was isolated by dissolving in DCM and extracting with water to remove any unreacted monomers. Removing DCM under reduced pressure gave the desired polysilylether polymer in yields ranging from 80-90%.

Figure 6:
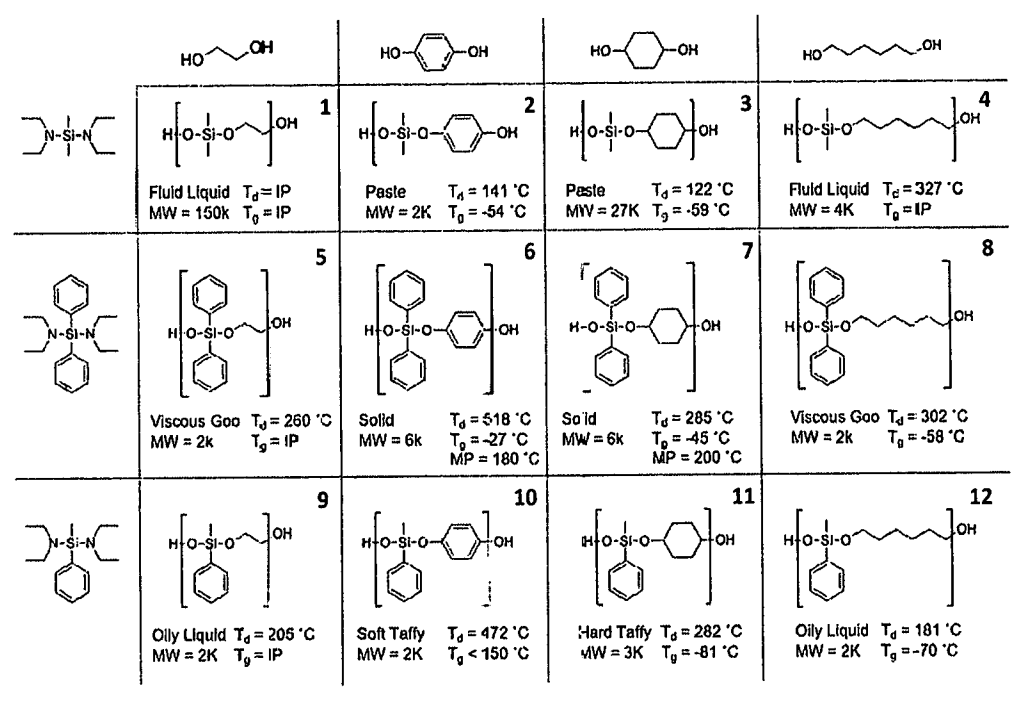

FIG. 6 illustrates the structure and physical characteristics of 12 different PSE polymers produced by the optimized method of the invention in a tabular format, where each individual PSE polymer is identified by a bold-faced number. Each of four different diol monomers: ethylene glycol, hydroquinone, 1,4-cyclohexanediol and 1,6-hexane diol (shown left to right along the x-axis of the table), was paired with each of three different silicon-based monomers: bis (diethylyamino) dimethylsilane, bis(diethylamino (diphenylsilane, and bis(diethylamino)methylphenylsilane (shown top to bottom along the y-axis of the table) producing the 12 different PSE polymers.

In FIG. 6, PSE polymer 1, poly(ethylene glycol)dimethylsilylether, resulted from the polymerization of bis(diethylamino)dimethylsilane with ethylene glycol. Similarly, PSE polymer 2, poly(hydroquinonc) dimethylsilylether, resulted from the polymerization of bis(diethylamino)dimethylsilane with hydroquinone. PSE polymer 3, poly(1,4-cyclohexanediol)dimethylsilylether, resulted from the polymerization of bis(diethylamino)dimethylsilane with 1,4-cyclohexanediol. PSE polymer 4, poly(1,6-hexanediol) dimethylsilylether, resulted from the polymerization of bis (diethylamino)dimethylsilane with 1,6-hexanediol. PSE polymer 5, poly(ethylene glycol)diphenylsilylether, resulted from the polymerization of bis(diethylamino)diphenylsilane with ethylene glycol. PSE polymer 6, poly(hydroquinone) diphenylsilylether, resulted from the polymerization of bis (diethylamino)diphenylsilane with hydroquinone. PSE polymer 7, poly(1,4-cyclohexanediol)diphenylsilylether, resulted from the polymerization of bis(diethylamino)diphenylsilane with 1,4-cyclohexanediol. PSE polymer 8, poly(1, 6-hexanediol)diphenylsilylether, resulted from the polymerization of bis(diethylamino)diphenylsilane with 1,6-hexanediol. PSE polymer 9, poly(ethylene glycol) methylphenylsilylether, resulted from the polymerization of bis(diethylamino)methylphenylsilane with ethylene glycol. PSE polymer 10, poly(hydroquinone)methylphenylsilylether, resulted from the polymerization of bis(diethylamino) methylphenylsilane with hydroquinone. PSE polymer 11, poly(1,4-cyclohexanediol)methylphenylsilylether, resulted from the polymerization of bis(diethylamino)methylphenylsilane with 1,4-cyclohexanediol. PSE polymer 12, poly(1, 6-hexanediol)methylphenylsilylether, resulted from the polymerization of bis(diethylamino)methylphenylsilane with 1,6-hexanediol.

The physical characteristics of the PSE polymers produced were diverse, ranging from: fluid liquids, e.g., PSE polymers 1 and 4; to viscous goos, e.g., PSE polymers 5 and 8; to thermoplastic solids, e.g., PSE polymers 6 and 7; as well as PSE polymers with properties in between. Structural confirmation of these PSE polymers was determined by NMR analysis. All polymers exhibited a one-to-one ratio, upon 1H integration in $CDCl_3$, of the respective starting monomers. Molecular weights of the polymers were determined by GPC analysis. Thermal decomposition was determined by TGA analysis. Glass transition temperature was determined by DSC analysis. Additionally, a melting point apparatus was used to determine the melting point for the two thermoplastic solids, i.e., PSE polymers 6 and 7.

Based on the initial data obtained for the PSE polymers described above, some general takeaways can be determined. First, the optimized synthesis successfully generated polymers in each scenario. This result indicates the synthesis is mild and tolerant of different groups and will likely work for the polymerization of functionalized monomers, e.g., nitro, fluoro, or iodo). Second, these materials are highly tailorable based on the monomers used for the polymerization, thus giving a great diversity of polymers. These polymers ranged from fluid-liquids to oily-liquids, to pastes, to viscous goos, to taffy-like materials, and to thermoplastic solids. This diversity allows PSE polymers to have a variety of potential applications moving forward. Third, for the most part, the thermal decomposition temperatures were high, and the glass transition temperatures were low, thus indicating a good operating temperature range for most of these polymers. Fourth, the thermoplastic solids, PSE polymers 6 and 7, had ideal softening and melting temperatures to be used for filament generation and extrusion. Finally, molecular weights for the materials ranged, however, the majority were in the 2-6k molecular weight range, indicating high MW polymers were not obtained. This differed from the high molecular weight observed for the model system, i.e., PSE polymer 1, which was used for synthesis optimization. It is likely that conditions would need to be optimized for each individual polymer to achieve higher molecular weights. However, this is not necessary for binder development since lower molecular weight HTPB (~2k) is typically used in formulations and cured with an isocyanate. Therefore, these PSE polymers are well suited to move on to formulation studies in their current form.

Surface Coating

Initially, uncured PSE polymer 5 was selected for solids loading studies with aluminum particles. PSE polymer 5 was selected because it is a sticky goo that coated glassware extremely well. PSE polymer 5 was dissolved in diethyl ether and mixed with aluminum particles of 1-3 µm (80% Al, 20% polymer), then an evaporated coating process was used to obtain the final materials for analysis. SEM analysis showed that the polymer coated aluminum particles clumped together, indicating good adhesion between particles. This configuration is likely due to the polymers forming an even surface coating and indicates they may perform well as binders in high solids loading applications.

Compatibility with Energetics

Initially, four uncured PSE polymers, i.e., PSE polymer 1, PSE polymer 4, PSE polymer 5 and PSE polymer 8, were selected for binder compatibility studies with RDX, an energetic explosive. These PSE polymers were selected based on their good thermal properties and similar viscosities to HTPB, a well-known binder and fuel in solid rocket propellant. All four of these PSE polymers were found to be compatible binders with RDX based on a standard differential scanning calorimetry (DSC) compatibility study. Based on these results, it is highly likely that all PSE polymers will be compatible binders with RDX, therefore indicating these materials are promising and are ready to move on to formulation studies of energetic materials.

Curing PSE Polymers with Isocyanates

The same four PSE polymers, i.e., PSE polymer 1, PSE polymer 4, PSE polymer 5 and PSE polymer 8, were also selected as drop-in replacements for HTPB in curing studies with isocyanate. It is important to confirm the PSE polymers can react similarly to HTPB and cure a formulation. In the case of AM munitions, the formulations would be prepared and printed, then allowed to cure after printing. Additionally, HTPB based formulations show poor stability against oxygen and strong oxidizers, due to the carbon-carbon double bonds in the backbone. Therefore, there is also interest in identifying polymers that could replace HTPB and have better compatibility in formulations with strong oxidizers. Furthermore, polymers that are more stable to oxygen may exhibit a longer service life due to decreased degradation over time. This effort was focused on determining the feasibility of replacing HTPB with a PSE polymer, that may have enhanced stability, but with similar or better mechanical properties. PSE polymer 1, PSE polymer 4, PSE polymer 5 and PSE polymer 8 were selected based on their good thermal properties and similar viscosities to HTPB.

PSE polymer curing was conducted similarly to that of a standard HTPB formulation, using the isocyanate isophorone diisocyanate (IPDI) and catalyst dibutyltin dilaurate (DBTDL). Curing of these materials was conducted by mixing a PSE polymer with IPDI and DBTDL. Rather than heating these mixtures overnight, they were allowed to sit at room temperature for six days so curing could be evaluated every day. The mixtures were checked every day and found to increase in hardness every day. PSE polymer 1 cured into a soft gelatinous-like material that will likely not be used for formulation efforts. PSE polymer 4 cured into a viscous goo with a similar consistency to honey. The addition of a crosslinker in future curing efforts will likely produce a materials with promising properties for formulation. PSE polymer 5 cured into a hard brittle solid. Which would likely not be useful for a formulation. PSE polymer 8 cured into a spongey rubbery material, indicating it shows good promise for future formulation efforts. The solid PSE polymers 5 and 8 were tested using a melting point apparatus, and both were found to begin decomposing around 200° C., which is consistent with the thermal decomposition of the urethane linkage in isocyanate cured HTPB formulations. Based on these results, it is highly likely that all PSE polymers will be curable with typical isocyanates that are used for existing formulations. Based on the PSE polymer used, different propertied can be obtained from the resulting cured material. This work indicates these materials are ready to move onto more advanced studies wherein they can be used as HTPB replacements in existing formulations with energetics.

The invention has been described with references to specific exemplary embodiments. While particular values, relationships, materials, and steps have been set forth for purposes of describing concepts of the invention, it will be appreciated by persons skilled in the art that numerous variations and/or modifications may be made to the invention as shown in the disclosed embodiments without departing from the spirit or scope of the basic concepts and operating principles of the invention as broadly described. It should be recognized that, in the light of the above teachings, those skilled in the art could modify those specifics without departing from the invention taught herein. Having now fully set forth certain embodiments and modifications of the concept underlying the present invention, various other embodiments as well as potential variations and modifications of the embodiments shown and described herein will obviously occur to those skilled in the art upon becoming familiar with such underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present embodiments are to be considered in all respects as illustrative and not restrictive.

The corresponding structures, materials, acts, and equivalents of all means or step plus function elements in the claims below are intended to include any structure, material, or act for performing the function in combination with other claimed elements as specifically claimed. The descriptions of the various embodiments herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A polysilylether (PSE) polymer binder system, comprising:
    1,3,5-Trinitroperhydro-1,3,5-triazine (RDX); and,
    a PSE polymer selected from one of an uncured poly(1,6-hexanediol)dimethylsilylether, and
    an uncured poly(1,6-hexanediol)diphenylsilylether.

* * * * *